United States Patent
Kubo et al.

(10) Patent No.: US 7,204,225 B2
(45) Date of Patent: Apr. 17, 2007

(54) INTERNAL COMBUSTION ENGINE WITH AUXILIARY COMBUSTION CHAMBER

(75) Inventors: Masaaki Kubo, Yokohama (JP); Toru Noda, Yokohama (JP); Isamu Hotta, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/071,284

(22) Filed: Mar. 4, 2005

(65) Prior Publication Data

US 2005/0205050 A1     Sep. 22, 2005

(30) Foreign Application Priority Data

Mar. 17, 2004    (JP)    ............... 2004-075485

(51) Int. Cl.
F02B 19/18    (2006.01)
F02B 19/00    (2006.01)

(52) U.S. Cl. ............ 123/266; 123/260; 123/286

(58) Field of Classification Search ........ 123/260, 123/261, 266, 269, 272, 275, 276, 283, 285, 123/286, 299, 298, 300
See application file for complete search history.

(56) References Cited

U.S. PATENT DOCUMENTS

| | | | | |
|---|---|---|---|---|
| 3,921,605 | A * | 11/1975 | Wyczalek ............... | 123/143 B |
| 3,926,158 | A * | 12/1975 | Dolza, Sr. .................. | 123/274 |
| 3,982,504 | A * | 9/1976 | Noguchi et al. ............ | 123/260 |
| 4,036,202 | A * | 7/1977 | Weslake ...................... | 123/279 |
| 4,071,001 | A * | 1/1978 | Goto ........................... | 123/260 |
| 4,106,448 | A * | 8/1978 | Noguchi et al. ............ | 123/268 |
| 4,270,498 | A | 6/1981 | Occella et al. | |
| 5,170,758 | A * | 12/1992 | Chmela ...................... | 123/276 |
| 5,215,053 | A * | 6/1993 | Ito .............................. | 123/276 |
| 5,746,171 | A * | 5/1998 | Yaoita ........................ | 123/275 |
| 6,035,823 | A * | 3/2000 | Koike et al. ................ | 123/276 |
| 6,116,208 | A * | 9/2000 | Nishimura et al. ......... | 123/295 |
| 6,443,122 | B1 * | 9/2002 | Denbratt et al. ............ | 123/301 |
| 6,494,178 | B1 * | 12/2002 | Cleary et al. ............... | 123/276 |
| 6,705,273 | B1 * | 3/2004 | Liu et al. .................... | 123/263 |
| 6,715,463 | B2 * | 4/2004 | Kudo et al. ................. | 123/261 |

(Continued)

FOREIGN PATENT DOCUMENTS

DE    1 526 290    4/1970

(Continued)

Primary Examiner—Mahmoud Gimie
(74) Attorney, Agent, or Firm—Foley & Lardner LLP

(57) ABSTRACT

An internal combustion engine includes a main combustion chamber and a small auxiliary combustion chamber. The main chamber is formed by a cylinder, the undersurface of a cylinder head, and the crown of a piston. A main ignition unit is disposed in the cylinder head, including a main body and a spark plug. The auxiliary chamber is formed within the main ignition unit. The main and auxiliary chambers are connected via a communication passage. The piston crown includes a cavity. When a fuel injection valve sprays fuel into the cavity on compression stroke, a tumble flow of fuel gas is generated to locally form a relatively rich air-fuel mixture near the communication passage. The air-fuel mixture partly flows into the auxiliary chamber as the piston travels upwardly. The air-fuel mixture in the auxiliary chamber is ignited by the spark plug so that a combustion flame propagates into the main chamber.

21 Claims, 2 Drawing Sheets

U.S. PATENT DOCUMENTS 6,840,211 B2 * 1/2005 Takahashi .................. 123/299
2004/0261760 A1 * 12/2004 Robinet ..................... 123/266
2006/0096571 A1 * 5/2006 Tourteaux et al. .......... 123/266

FOREIGN PATENT DOCUMENTS

| DE | 36 36 885 A1 | 5/1988 |
|----|--------------|--------|
| EP | 1 007 828 B1 | 1/2003 |
| FR | 2 781 840 A1 | 2/2000 |
| JP | 06-017710 A  | 1/1994 |

* cited by examiner

INTERNAL COMBUSTION ENGINE WITH AUXILIARY COMBUSTION CHAMBER

BACKGROUND OF THE INVENTION

The present invention relates generally to internal combustion engines with an auxiliary combustion chamber in each cylinder, and more particularly to a stratified-charge reciprocating internal combustion engine with an auxiliary combustion chamber in each cylinder.

In recent years, there have been proposed and developed various direct-injection spark-ignition reciprocating internal combustion engines with an auxiliary combustion chamber in each cylinder. A Published Japanese Patent Application No. H6(1994)-17710 shows such a direct-injection spark-ignition reciprocating internal combustion engine with an auxiliary combustion chamber in each cylinder. In this engine, a cylinder head includes a cavity serving as an auxiliary combustion chamber in conjunction with a piston crown. A spark plug is provided in the auxiliary combustion chamber. Fuel is supplied into the auxiliary combustion chamber through an auxiliary fuel gas supply port. The auxiliary fuel gas supply port is connected to a fuel supply via a pressure control valve and a supply control valve. The pressure control valve, the supply control valve, and the auxiliary fuel gas supply port serve as a fuel injection valve. In the auxiliary combustion chamber, intake air and fuel are mixed to form a rich air-fuel mixture. The rich air-fuel mixture formed in the auxiliary combustion chamber is ignited by the spark plug, so that a combustion flame propagates within a main combustion chamber next to the auxiliary combustion chamber. Thus, the engine allows overall lean air-fuel mixture to burn, resulting in a decrease in fuel consumption.

SUMMARY OF THE INVENTION

The above-mentioned conventional engine includes a relatively large auxiliary combustion chamber, because the auxiliary combustion chamber is configured to directly receive the supplied fuel. The large size of the auxiliary combustion chamber results in a large amount of cooling loss. Accordingly, the overall thermal efficiency of this engine cannot be highly increased. On the other hand, the structure of the conventional engine basically includes a disadvantage in the mixing of fuel and air. However, in general, during operating in high-load conditions, the engine uses a uniformly well-mixed air-fuel mixture. Therefore, this engine has a disadvantage in the performance in high-load conditions or in the output power at full throttle.

Accordingly, it is an object of the present invention to provide an internal combustion engine with an auxiliary combustion chamber in each cylinder, which produces highly efficient lean-burn combustion with little cooling loss.

According to one aspect of the present invention, an internal combustion engine comprises a main combustion chamber having a variable volumetric capacity; an auxiliary combustion chamber; a communication passage to provide fluid communication between the main combustion chamber and the auxiliary combustion chamber; a mixture formation section to locally form a relatively rich air-fuel mixture around an opening of the communication passage in the main combustion chamber; and an ignition unit to ignite an air-fuel mixture in the auxiliary combustion chamber which is supplied from the relatively rich air-fuel mixture in the main combustion chamber in accordance with a decrease in the volumetric capacity of the main combustion chamber, to produce a combustion flame to propagate through the communication passage into the relatively rich air-fuel mixture in the main combustion chamber.

According to another aspect of the invention, an internal combustion engine comprises a main combustion chamber having a variable volumetric capacity; an auxiliary combustion chamber; communication means for providing fluid communication between the main combustion chamber and the auxiliary combustion chamber; mixture formation means for locally forming a relatively rich air-fuel mixture around an opening of the communication means in the main combustion chamber; and ignition means for igniting an air-fuel mixture in the auxiliary combustion chamber which is supplied from the relatively rich air-fuel mixture in the main combustion chamber in accordance with a decrease in the volumetric capacity of the main combustion chamber, to produce a combustion flame to propagate through the communication means into the relatively rich air-fuel mixture in the main combustion chamber.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
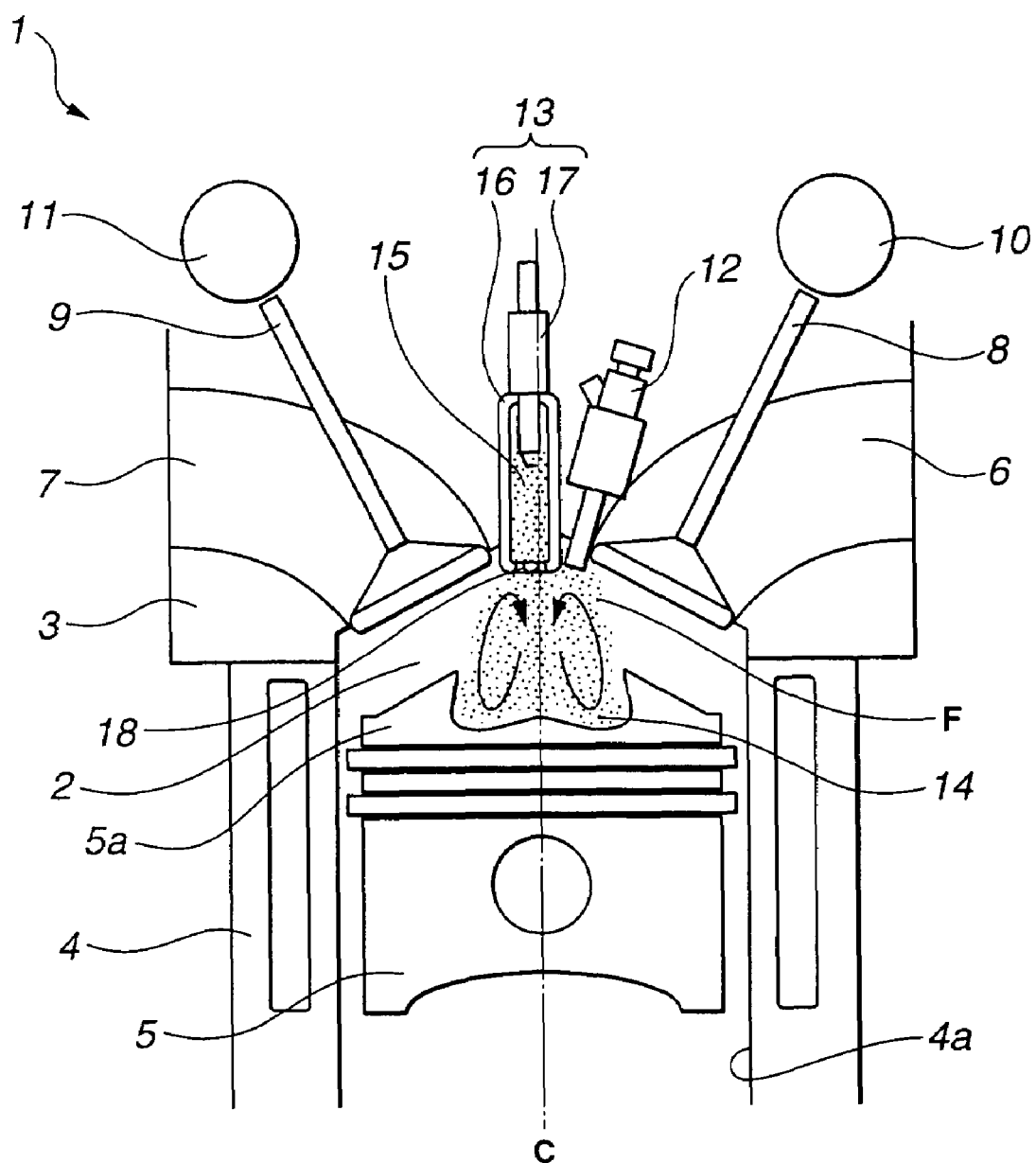
FIG. 1 is a schematic diagram depicting a side sectional view of a direct-injection spark-ignition reciprocating internal combustion engine in accordance with a first embodiment of the present invention.

Referring now to FIG. 1, there is shown a direct-injection spark-ignition reciprocating internal combustion engine 1 in accordance with a first embodiment of the present invention. A main combustion chamber 2 of each cylinder of internal combustion engine 1 is formed by the undersurface of a cylinder head 3, the side wall of a cylinder bore 4a formed in a cylinder block 4, and a crown portion 5a of a piston 5 reciprocable in cylinder bore 4a. The volumetric capacity of main combustion chamber 2 varies in accordance with up-and-down motion of piston 5. A portion of the undersurface of cylinder head 3 which faces main combustion chamber 2 or serves to form the top portion of main combustion chamber 2 includes a recessed portion formed into a pent-roof shape including a pair of inclined surfaces. The inclined surface of the pent-roof shaped portion on the intake side (on the right side in FIG. 1) includes portions each defining an opening of each of a pair of intake ports 6. The other inclined surface of the pent-roof shaped portion on the exhaust side includes portions each defining an opening of each of a pair of exhaust ports 7. At each of the openings of intake ports 6 is provided an intake valve 8. At each of the openings of exhaust ports 7 is provided an exhaust valve 9. Intake valve 8 is actuated by an intake cam machined as an integral part of an intake camshaft 10, to change the opening of intake port 6. Exhaust valve 9 is actuated by an exhaust cam machined as an integral part of an exhaust camshaft 11, to change the opening of exhaust port 7.

Mounted near the apex of the pent-roof shaped portion of cylinder head 3, a fuel injection valve 12 and a main ignition unit 13 have their inward ends located in a central portion of main combustion chamber 2, that is, in a portion of the undersurface of cylinder head 3 surrounded by two intake valves 8 and two exhaust valves 9. More specifically, main ignition unit 13, formed into a cylindrical shape, is located substantially along a central axis C of cylinder bore 4*a*. Cylinder central axis C is identical with a central axis of main combustion chamber 2. The central portion of main combustion chamber 2 is a region near around cylinder central axis C or the central axis of main combustion chamber 2. The longitudinal axis of main ignition unit 13, substantially in parallel with cylinder central axis C, is slightly offset toward the exhaust side to allocate a space to mount fuel injection valve 12. Fuel injection valve 12 is located in a portion slightly offset toward the intake side from cylinder central axis C. The longitudinal axis of fuel injection valve 12 is inclined with respect to cylinder central axis C, with its lower end oriented toward the central portion of main combustion chamber 2.

Fuel injection valve 12 injects or sprays fuel directly into main combustion chamber 2. The inward end portion of fuel injection valve 12 includes a plurality of jet outlets arranged in a circle (not shown). The fuel is sprayed through the jet outlets in a cone shaped pattern for maximum distribution and atomization. The central axis of the cone shaped spray pattern is identical to the central axis of fuel injection valve 12. Accordingly, the central axis of the cone shaped spray pattern is slightly inclined with respect to cylinder central axis C, extending substantially toward the central portion of piston crown 5*a* at top dead center.

Main ignition unit 13 is comprised of a main body 16 and an ignition unit such as a spark plug 17 connected to the proximal (outward) end portion of main body 16. Main body 16 is formed into a hollow cylindrical shape, including an auxiliary combustion chamber 15 which is smaller in volumetric capacity than main combustion chamber 2. Auxiliary combustion chamber 15 is in fluid communication with main combustion chamber 2 through a plurality of communication passages 18 formed in the distal (inward) end portion of main body 16. The opening of communication passage 18 in main combustion chamber 2 is disposed near cylinder central axis C. As discussed below in detail, the air-fuel mixture in auxiliary combustion chamber 15 is ignited by spark plug 17, to allow the combustion flame to propagate through communication passage 18 into main combustion chamber 2, and thereby to ignite the air-fuel mixture in main combustion chamber 2.

More specifically, main body 16 of main ignition unit 13 is formed into a hollow cylindrical shape with both ends closed. The bottom portion of main body 16, or the distal end portion of main body 16 is extending through the undersurface of cylinder head 3 slightly into main combustion chamber 2. This distal end portion includes communication passages 18. Communication passage 18 extends along or in parallel with the central axis of main body 16, and therefore along or in parallel with cylinder central axis C. Spark plug 17 includes a discharging gap at its inward tip. Spark plug 17 is attached to the proximal end portion of main body 16, with the inward tip of spark plug 17 inserted into auxiliary combustion chamber 15.

On the other hand, piston crown 5*a* includes an outer (peripheral) portion formed to fit the pent-roof shaped recessed portion of the undersurface of cylinder head 3, and a central cavity 14. Cavity 14 has a circular shape whose center is located substantially at the center of piston crown 5*a*, in a top view (viewed downwardly in the direction of cylinder central axis C). The side wall of cavity 14 is a part of a circular conical surface close to a cylindrical surface. Specifically, the circular conical surface becomes narrower upwardly with a little inclination. The bottom portion of cavity 14 includes at its central portion a protruded circular conical surface with a low profile. The side wall and bottom portion of cavity 14 are smoothly and continuously connected with a curved face. Although the side wall of cavity 14 is formed as discussed above, the side wall may be alternatively formed into a cylindrical surface or a part of an inverted circular conical surface with an apex below. In addition, the bottom portion of cavity 14 may be flatly formed.

Internal combustion engine 1, configured as described above, includes two combustion modes. One is a stratified combustion mode in which internal combustion engine 1 performs stratified charge combustion. The other is a homogeneous combustion mode in which internal combustion engine 1 performs homogeneous charge combustion. Internal combustion engine 1 switches the combustion mode, and operates in the selected combustion mode, in accordance with the engine operating condition.

During operating in low load conditions in which the quantity of fuel injection is desired to be small, internal combustion engine 1 performs the stratified charge combustion in the stratified combustion mode. As shown in FIG. 1, in the stratified charge combustion, fuel injection valve 12 sprays fuel toward cavity 14 of piston 5 on the compression stroke, to locally form an ignitable and combustible relatively rich air-fuel mixture layer F in a region including cavity 14 and a space over cavity 14. More specifically, sprayed by fuel injection valve 12, fuel gas collides against the bottom portion of cavity 14, travels along the curve of cavity 14, and then moves up. Thus, guided by cavity 14, a circulating flow or a tumble flow of the fuel is formed in the region, indicated by curved arrows in FIG. 1. Induced by the tumble flow, the air near around the tumble flow flows with the tumble flow so that fuel and air are well mixed. Because cavity 14 is located substantially in the central portion of piston crown 5*a*, richer air-fuel mixture layer F is formed in the horizontally central space of main combustion chamber 2. Accordingly, richer air-fuel mixture layer F is located close to the inward tip of main ignition unit 13 located at the central portion of main combustion chamber 2. Thus, fuel injection valve 12 serves as a mixture formation section to locally form a relatively rich air-fuel mixture F around the opening of communication passage 18 in main combustion chamber 2. As the compression stroke proceeds (piston 5 travels upwardly) after this condition is formed, a part of richer air-fuel mixture layer F is supplied via communication passage 18 into auxiliary combustion chamber 15. In other words, the air-fuel mixture is supplied to auxiliary combustion chamber 15 from relatively rich air-fuel mixture F in main combustion chamber 2 in accordance with a decrease in the volumetric capacity of main combustion chamber 2 which is caused by an upward motion of piston 5. At this moment, the burned gas left in auxiliary combustion chamber 15, which is generated in the last combustion cycle, is compressed in the upper portion of auxiliary combustion chamber 15. The air-fuel mixture moves into auxiliary combustion chamber 15 in accordance with the upward motion of piston 5, and reaches the discharging gap of spark plug 17. When spark plug 17 is discharged, the air-fuel mixture in auxiliary combustion chamber 15 is ignited to burn, so that the temperature and pressure in auxiliary combustion chamber 15 rapidly increases. As the pressure rises, the combustion flame propagates into main combustion chamber 2 via communication passage 18. Richer air-fuel mixture layer F in main combustion chamber 2 is located near around the inward tip of main ignition unit 13 (communication passage 18), when the combustion flame propagates into main combustion chamber 2. Accordingly, the combustion flame travels through communication passage 18 into main combustion chamber 2, to jet from the opening of communication passage 18 to richer air-fuel mixture layer F in main combustion chamber 2, and to form a torch-shaped flame at the inward tip of main ignition unit 13, so that the whole of richer air-fuel mixture layer F burns.

In accordance with the above-mentioned pattern of ignition and combustion, internal combustion engine 1 can perform a stable process of ignition and combustion of a lean air-fuel mixture. The overall (average) air-fuel ratio of richer air-fuel mixture layer F may be leaner than stoichiometric or a relatively high value such as about 30 (about 0.5 in equivalence ratio). With increasing overall air-fuel ratio of richer air-fuel mixture layer F, the combustion temperature of richer air-fuel mixture layer F decreases, resulting in a small quantity of NOx generation. The average air-fuel ratio in main combustion chamber 2 increases with increasing overall air-fuel ratio of richer air-fuel mixture layer F, to further improve fuel economy compared with a conventional stratified charge engine.

In a typical conventional spark-ignition stratified-charge internal combustion engine, the air-fuel ratio of a richer air-fuel mixture layer of a stratified air-fuel mixture is set to be around the stoichiometric air-fuel ratio, to stabilize the combustion. This results in a relatively large quantity of NOx generation, and prevents using a stratified air-fuel mixture with a relatively lean overall air-fuel ratio. In contrast to this conventional engine, internal combustion engine 1 can use a relatively lean richer air-fuel mixture layer F, to provide a high level of balance between the decrease in NOx generation and the improvement in fuel economy.

As described above, communication passage 18 is disposed extending substantially in parallel with cylinder central axis C. Accordingly, drawn from communication passage 18, the combustion flame travels downwardly along cylinder central axis C. Therefore, located directly below main ignition unit 13, richer air-fuel mixture layer F is ignited to burn in a favorable condition.

As discussed above, the air-fuel mixture supplied to auxiliary combustion chamber 15 is a part of richer air-fuel mixture layer F which is formed near around communication passage 18 in main combustion chamber 2. Therefore, the air-fuel ratio of the air-fuel mixture in auxiliary combustion chamber 15 is basically equal to the air-fuel ratio of richer air-fuel mixture layer F. If the air-fuel ratio of richer air-fuel mixture layer F is too high, the stability of ignition and combustion of the air-fuel mixture in auxiliary combustion chamber 15 tends to decrease. However, the volumetric capacity of auxiliary combustion chamber 15 is much smaller than that of main combustion chamber 2. In addition, auxiliary combustion chamber 15 is not completely open to main combustion chamber 2, that is, is closed to main combustion chamber 2 except communication passage 18. Accordingly, the temperature and pressure in auxiliary combustion chamber 15 rapidly increase after the ignition caused by the discharge of spark plug 17, resulting in ensuring the stability of ignition and combustion in auxiliary combustion chamber 15. Therefore, the air-fuel ratio of richer air-fuel mixture layer F (or the air-fuel ratio of the air-fuel mixture in auxiliary combustion chamber 15) may be set to a value larger than a general lean side air-fuel ratio stability threshold such as 0.6 in equivalence ratio.

The air-fuel ratio of the air-fuel mixture in auxiliary combustion chamber 15 can be reduced to be lower than the overall air-fuel ratio of richer air-fuel mixture layer F in main combustion chamber 2. This allows to set the overall air-fuel ratio of richer air-fuel mixture layer F in main combustion chamber 2 to be a higher value. This adjusted and non-homogeneous distribution of the air-fuel ratio in richer air-fuel mixture layer F may be implemented by split fuel injection including a primary injection and a secondary injection on the compression stroke. After the primary injection forms the above-mentioned tumble flow, the secondary injection increases the fuel concentration in the central and upper portion of richer air-fuel mixture layer F near around communication passage 18. The relatively rich air-fuel mixture in this portion of richer air-fuel mixture layer F flows into auxiliary combustion chamber 15. The volumetric capacity of auxiliary combustion chamber 15 is small so that the decrease in the air-fuel ratio in auxiliary combustion chamber 15 has only little effect on emission of NOx of internal combustion engine 1 as a whole. The adjusted distribution of the air-fuel ratio in richer air-fuel mixture layer F is not limited to the above-mentioned process by the split fuel injection. This distribution may be implemented by any configuration or process which allows the fuel concentration near around communication passage 18 to be relatively low just before the induction of the air-fuel mixture into auxiliary combustion chamber 15.

The overall air-fuel ratio of richer air-fuel mixture layer F increases with decreasing engine load, during internal combustion engine 1 operating in the stratified charge combustion mode. Accordingly, in the stratified charge combustion mode, the fuel distribution in stratified air-fuel mixture F may be changed in accordance with the engine load. More specifically, when the engine load is relatively low in the stratified charge combustion mode, the fuel distribution in stratified air-fuel mixture F may be controlled by the above-mentioned split fuel injection. On the other hand, when the engine load is relatively high in the stratified charge combustion mode, the fuel distribution in stratified air-fuel mixture F may be controlled to be substantially homogeneous.

In order to further increase the stability of ignition and combustion in auxiliary combustion chamber 15, internal combustion engine 1 may include a variable compression ratio control mechanism capable of continuously changing the compression ratio, to increase the compression ratio with decreasing engine load.

In contrast to the stratified charge combustion in low load conditions, internal combustion engine 1 performs the homogeneous charge combustion during operating in high load conditions in which the quantity of fuel injection is desired to be large. In the homogeneous charge combustion, fuel is sprayed on the intake stroke, to form a homogeneous air-fuel mixture in main combustion chamber 2. In order to improve fuel economy, the average air-fuel ratio of the air-fuel mixture in main combustion chamber 2 may be a lean air-fuel mixture. Alternatively, internal combustion engine 1 may perform exhaust gas recirculation (EGR), regulating the average air-fuel ratio in main combustion chamber 2 to the stoichiometric air-fuel ratio.

Figure 2:
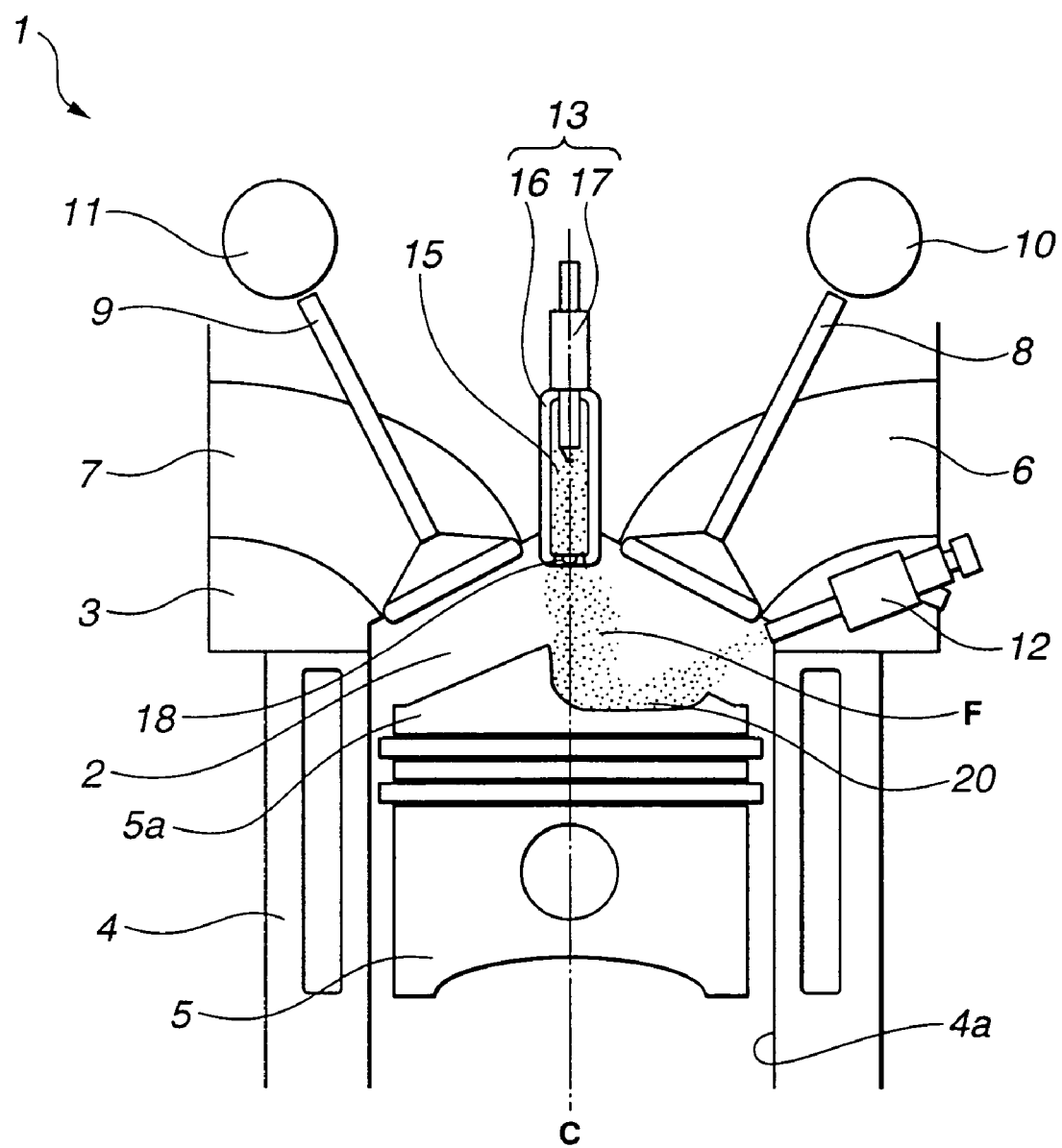
FIG. 2 is a schematic diagram depicting a side sectional view of a direct-injection spark-ignition reciprocating internal combustion engine in accordance with a second embodiment of the present invention.

Referring now to FIG. 2, there is shown a direct-injection spark-ignition reciprocating internal combustion engine 1 in accordance with a second embodiment of the present invention. In the second embodiment, the location of fuel injection valve 12, and the shape of piston crown 5a are modified with respect to the structure of the first embodiment. More specifically, fuel injection valve 12 is disposed in a horizontal position between the pair of intake ports 6 and in a vertical position under intake ports 6, in the intake-side peripheral wall of main combustion chamber 2, to spray fuel into main combustion chamber 2. Piston crown 5a includes a cavity 20 in an intake-side portion offset from its central axis to the intake side. Cavity 20 induces the fuel gas sprayed from fuel injection valve 12 toward main ignition unit 13. There is only main ignition unit 13 in the central portion of main combustion chamber 2. Accordingly, there is no need to provide a space for attaching fuel injection valve 12 in the central portion of main combustion chamber 2. Therefore, the central axis of main ignition unit 13 is configured to be identical to cylinder central axis C, in the second embodiment.

As in the first embodiment, richer air-fuel mixture layer F is formed in the central portion of main combustion chamber 2. In other words, in the second embodiment, richer air-fuel mixture layer F is formed directly below main ignition unit 13. Accordingly, communication passage 18 is provided extending along or substantially in parallel with cylinder central axis C. However, actually, locating fuel injection valve 12 on the intake side causes a slight deviation of richer air-fuel mixture layer F toward the intake side. Accordingly, communication passage 18 may be slightly inclined with the opening oriented slightly toward the intake side of main combustion chamber 2.

In the above-mentioned embodiments, spark plug 17 serves as an auxiliary ignition unit to ignite the air-fuel mixture in auxiliary combustion chamber 15. The auxiliary ignition unit may further include a catalyst for promoting oxidation of fuel. More specifically, an oxidation catalyst, which is activated by a heater or a heat of the burned gas, is disposed at the proximal end of the main body of main ignition unit 13. When the air-fuel mixture in auxiliary combustion chamber 15 is brought into contact with the catalyst in accordance with the upward motion of piston 5, the air-fuel mixture is ignited at the contact surface. With main ignition unit 13 thus configured, the air-fuel ratio of richer air-fuel mixture layer F formed in main combustion chamber 2 may be set larger.

In the above-mentioned embodiments, auxiliary combustion chamber 15 has a relatively small volumetric capacity. In addition, auxiliary combustion chamber 15 is closed to main combustion chamber 2 except communication passage 18. Accordingly, the auxiliary ignition unit can perform stable ignition and combustion of a lean air-fuel mixture in auxiliary combustion chamber 15.

In the above-mentioned embodiments, internal combustion engine 1 can use a much lean stratified air-fuel mixture, to provide a high level of balance between the decrease in NOx generation and the improvement in fuel economy. The relatively compact design of auxiliary combustion chamber 15 results in minimizing the increase in cooling loss caused by providing auxiliary combustion chamber 15. The engine performance during homogeneous charge combustion employed in high load conditions is little influenced by auxiliary combustion chamber 15, because the air-fuel mixture is formed in main combustion chamber 2.

This application is based on a prior Japanese Patent Application No. 2004-75485 filed on Mar. 17, 2004. The entire contents of this Japanese Patent Application No. 2004-75485 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An internal combustion engine comprising:
   a main combustion chamber having a variable volumetric capacity;
   an auxiliary combustion chamber;
   a communication passage extending along a relative travel direction of a barycenter of the main combustion chamber to provide fluid communication between the main combustion chamber and the auxiliary combustion chamber;
   a mixture formation section to locally form a relatively rich air-fuel mixture around an opening of the communication passage in the main combustion chamber; and
   an ignition unit to ignite an air-fuel mixture in the auxiliary combustion chamber which is supplied from the relatively rich air-fuel mixture in the main combustion chamber in accordance with a decrease in the volumetric capacity of the main combustion chamber, to produce a combustion flame to propagate through the communication passage into the relatively rich air-fuel mixture in the main combustion chamber,
   wherein the main combustion chamber includes enough space around the opening of the communication passage for the combustion flame to propagate through, when the volumetric capacity of the main combustion chamber is minimum,
   wherein the internal combustion engine further comprises a cylinder and a piston reciprocable in the cylinder,
   wherein the main combustion chamber is defined by the cylinder and the piston,
   wherein the decrease in the volumetric capacity of the main combustion chamber is caused by an upward motion of the piston,
   wherein the mixture formation section comprises a fuel injection valve configured to spray fuel into the main combustion chamber on a compression stroke of the engine and to form the relatively rich air-fuel mixture,
   wherein the piston includes a crown portion including a cavity,
   wherein the fuel injection valve is configured to spray fuel toward a bottom portion of the cavity, and
   wherein the cavity is formed in such a manner to guide the sprayed fuel toward the auxiliary combustion chamber.

2. The internal combustion engine as claimed in claim 1, wherein the opening of the communication passage is disposed near a central axis of the main combustion chamber.

3. The internal combustion engine as claimed in claim 2, wherein the communication passage extends along the central axis of the main combustion chamber.

4. The internal combustion engine as claimed in claim 1, wherein the fuel injection valve is disposed near a central axis of the main combustion chamber.

5. The internal combustion engine as claimed in claim 4, wherein the cavity is a circular cavity in a central portion of the crown portion of the piston.

6. The internal combustion engine as claimed in claim 5, wherein the bottom portion of the cavity includes a protruded circular conical surface.

7. The internal combustion engine as claimed in claim 1, wherein the fuel injection valve is disposed in an intake-side peripheral wall of the main combustion chamber.

8. The internal combustion engine as claimed in claim 7, wherein the cavity is a circular cavity in an intake-side portion of the crown portion of the piston.

9. The internal combustion engine as claimed in claim 8, wherein the communication passage extends inclined with the opening oriented toward an intake-side portion of the main combustion chamber.

10. The internal combustion engine as claimed in claim 1, wherein a concentration of fuel of the air-fuel mixture in the auxiliary combustion chamber is lower than an overall fuel concentration of the relatively rich air-fuel mixture in the main combustion chamber.

11. The internal combustion engine as claimed in claim 10, wherein the mixture formation section comprises a fuel injection valve disposed near a central axis of the main combustion chamber, to spray fuel into the main combustion chamber on a compression stroke of the engine, to form the relatively rich air-fuel mixture, and wherein the fuel injection valve is configured to perform a split fuel injection to increase the fuel concentration of a part of the relatively rich air-fuel mixture near and/or around the communication passage.

12. The internal combustion engine as claimed in claim 1, wherein the ignition unit comprises a spark plug to ignite the air-fuel mixture.

13. The internal combustion engine as claimed in claim 1, wherein the ignition unit comprises a catalyst to promote oxidation of fuel.

14. The internal combustion engine as claimed in claim 1, wherein the relatively rich air-fuel mixture in the main combustion chamber is leaner than stoichiometric.

15. The internal combustion engine as claimed in claim 14, wherein an equivalence ratio of the relatively rich air-fuel mixture in the main combustion chamber is lower than or equal to 0.6.

16. The internal combustion engine as claimed in claim 1, further comprising a variable compression ratio control mechanism to increase a compression ratio of the internal combustion engine with decreasing engine load.

17. An internal combustion engine comprising:
a main combustion chamber having a variable volumetric capacity;
an auxiliary combustion chamber;
a communication means extending along a relative travel direction of a barycenter of the main combustion chamber for providing fluid communication between the main combustion chamber and the auxiliary combustion chamber;
a mixture formation means for locally forming a relatively rich air-fuel mixture around an opening of the communication means in the main combustion chamber; and
an ignition means for igniting an air-fuel mixture in the auxiliary combustion chamber which is supplied from the relatively rich air-fuel mixture in the main combustion chamber in accordance with a decrease in the volumetric capacity of the main combustion chamber, to produce a combustion flame to propagate through the communication means into the relatively rich air-fuel mixture in the main combustion chamber,
wherein the main combustion chamber includes enough space around the opening of the communication means for the combustion flame to propagate through, when the volumetric capacity of the main combustion chamber is minimum,
wherein the internal combustion engine further comprises a cylinder and a piston reciprocable in the cylinder,
wherein the main combustion chamber is defined by the cylinder and the piston,
wherein the decrease in the volumetric capacity of the main combustion chamber is caused by an upward motion of the piston,
wherein the mixture formation means comprises a fuel injection means configured to spray fuel into the main combustion chamber on a compression stroke of the engine and to form the relatively rich air-fuel mixture,
wherein the piston includes a crown portion including a cavity,
wherein the fuel injection means is configured to spray fuel toward a bottom portion of the cavity, and
wherein the cavity is formed in such a manner to guide the sprayed fuel toward the auxiliary combustion chamber.

18. An internal combustion engine comprising:
a cylinder;
a piston reciprocable in the cylinder, including a crown portion including a circular cavity formed smoothly and continuously with a curved face;
a main combustion chamber defined by the cylinder and the piston and having a variable volumetric capacity;
an auxiliary combustion chamber;
a communication passage to provide fluid communication between the main combustion chamber and the auxiliary combustion chamber;
a fuel injection valve to spray the fuel toward a bottom portion of the cavity on a compression stroke of the engine, to locally form a relatively rich air-fuel mixture around an opening of the communication passage in the main combustion chamber; and
an ignition unit to ignite an air-fuel mixture in the auxiliary combustion chamber which is supplied from the relatively rich air-fuel mixture in the main combustion chamber in accordance with a decrease in the volumetric capacity of the main combustion chamber, to produce a combustion flame to propagate through the communication passage into the relatively rich air-fuel mixture in the main combustion chamber,
wherein the cavity is formed in such a manner to guide the sprayed fuel toward the auxiliary combustion chamber.

19. The internal combustion engine as claimed in claim 18, wherein the bottom portion of the cavity includes a protruded circular conical surface.

20. The internal combustion engine as claimed in claim 18, wherein the communication passage extends inclined with the opening oriented toward an intake-side portion of the main combustion chamber.

21. The internal combustion engine as claimed in claim 18, wherein a concentration of fuel of the air-fuel mixture in the auxiliary combustion chamber is lower than an overall fuel concentration of the relatively rich air-fuel mixture in the main combustion chamber, wherein a mixture formation section comprises the fuel injection valve, which is disposed near a central axis of the main combustion chamber, to spray fuel into the main combustion chamber on a compression stroke of the engine, to form the relatively rich air-fuel mixture, and wherein the fuel injection valve is configured to perform a split fuel injection to increase the fuel concentration of a part of the relatively rich air-fuel mixture near and/or around the communication passage.

* * * * *